US010467421B2

(12) United States Patent
Aamir et al.

(10) Patent No.: US 10,467,421 B2
(45) Date of Patent: Nov. 5, 2019

(54) ESTABLISHING TRUST BETWEEN CONTAINERS

(71) Applicant: ORACLE INTERNATIONAL CORPORATION, Redwood Shores, CA (US)

(72) Inventors: Mohammad Aamir, San Jose, CA (US); Atta Ur Rehman, Cambridge (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 449 days.

(21) Appl. No.: 15/267,044

(22) Filed: Sep. 15, 2016

(65) Prior Publication Data

US 2017/0116424 A1    Apr. 27, 2017

Related U.S. Application Data

(60) Provisional application No. 62/245,534, filed on Oct. 23, 2015.

(51) Int. Cl.
| | |
|---|---|
| *H04L 9/08* | (2006.01) |
| *G06F 21/60* | (2013.01) |
| *H04L 29/06* | (2006.01) |
| *G06F 21/53* | (2013.01) |
| *G06F 21/62* | (2013.01) |
| *H04W 12/06* | (2009.01) |
| *H04W 12/00* | (2009.01) |

(52) U.S. Cl.
CPC ............ *G06F 21/606* (2013.01); *G06F 21/53* (2013.01); *G06F 21/6281* (2013.01); *H04L 9/083* (2013.01); *H04L 9/0825* (2013.01); *H04L 63/0435* (2013.01); *H04L 63/062* (2013.01); *H04L 63/0815* (2013.01); *H04W 12/0027* (2019.01); *H04W 12/06* (2013.01); *G06F 2221/2149* (2013.01); *H04L 63/0876* (2013.01)

(58) Field of Classification Search
CPC ................................. G06F 21/53; H04L 9/083
USPC ....................................................... 713/155
See application file for complete search history.

(56) References Cited

U.S. PATENT DOCUMENTS 8,595,810 B1 * 11/2013 Ben Ayed ........... H04L 63/0815
                                                                        713/168
9,626,525 B2 *  4/2017 Momchilov ........ H04L 63/0815
(Continued)

OTHER PUBLICATIONS

International Application No. PCT/US2016/052139, International Search Report and Written Opinion dated Nov. 11, 2016, 11 pages.

*Primary Examiner* — Jason K Gee
*Assistant Examiner* — Dereena T Cattungal
(74) *Attorney, Agent, or Firm* — Kilpatrick Townsend & Stockton LLP

(57) ABSTRACT

Techniques are provided for establishing a secure exchange of data between containerized applications. A method can include registering, by a device, a first containerized application on the device with an access server, registering, by the device, a second containerized application on the device with the access server, verifying that the first containerized application and the second containerized application are configured to exchange data, and exchanging data between the first containerized application and the second containerized application registered with the access server.

20 Claims, 9 Drawing Sheets

(56) References Cited

U.S. PATENT DOCUMENTS

| | | | |
|---|---|---|---|
| 2011/0270748 A1* | 11/2011 | Graham, III | G06Q 20/102 |
| | | | 705/40 |
| 2014/0194094 A1 | 7/2014 | Ahuja et al. | |
| 2014/0250511 A1* | 9/2014 | Kendall | H04L 63/0815 |
| | | | 726/6 |
| 2015/0046712 A1 | 2/2015 | Korkishko et al. | |
| 2016/0191645 A1* | 6/2016 | Hayton | G06F 9/445 |
| | | | 709/203 |
| 2017/0094509 A1* | 3/2017 | Mistry | H04L 63/083 |

* cited by examiner

ESTABLISHING TRUST BETWEEN CONTAINERS

CROSS-REFERENCE TO RELATED APPLICATION

This application is a non-provisional application and claims the benefit and priority of U.S. Provisional Application No. 62/245,534, filed on Oct. 23, 2015 titled "METHOD OF TRUST BETWEEN CONTAINERS," which is herein incorporated by reference in its entirety for all purposes.

BACKGROUND

The present disclosure relates generally to establishing a secure exchange of data between containerized applications. In particular, the disclosure relates to the secure exchange of data between containerized applications running on a same device and registered to a same access server, such an Oracle Mobile Security Access Server.

When an application, such as a containerized application, is installed on a device, such as a mobile device, the application is launched. A user of the device will be asked to authenticate themselves with the access server in order to determine if they are an authorized user. If the user is authenticated, they will be allowed to access the application and its data. If another application, such as a containerized application, is installed on the device and is registered to the same access server, and the application has already been authenticated and holds a session token and a data encryption key (root-Key), then a single sign-on (SSO) can be performed between the applications.

SSO is the ability for a user to enter the same ID and password in order to logon to multiple applications within an enterprise. An access manager may manage access to one or more resources by implementing a SSO system. The SSO system may provide a SSO session that enables an authenticated application to access protected resources to which the application is entitled to access.

Data can be shared between applications by using intents and broadcasts. An intent or parcel is a message package that can provide a facility for performing late runtime binding between the code in different applications. An intent can be used to, for example, start an activity, start a service, and/or deliver a broadcast. An intent can be a passive data structure holding an abstract description of an action or topic. For example, an intent can contain a message. A broadcast can be a message that an application can receive. A system can deliver various types of broadcasts for system events.

Intents and broadcasts can be registered on an action, such as a custom action. A custom action can be defined by, for example, a developer. An action is a general action to be performed. Actions can include, for example, displaying information, editing information, etc. When an application launches an intent and broadcast on an action, other applications listening for that action can receive the intent, which contains a message that is broadcasted on the action.

However, if a rogue application or unauthorized application also registers itself on the same action, the rogue application can receive the intent and broadcast and would be able to access all of the data that is present in the intent. Therefore, data on intents and broadcasts needs to be protected from rogue applications.

The message exchange between the applications can be secured by using a signature level protection. Signature level protection is used in, for example, Android® applications. By using signature level protection, a second application can be allowed to communicate with the first application only if the second application is signed by the same signer or if the second application has the same signing certificate as the first application.

However, same signer information may not be possible. For example, containerization tools for mobile application management systems, such as an Oracle Mobile Security Suite (OMSS) containerization tool, can be used to containerize any third party application. The containerized applications can then be uploaded to application stores and used by users. These containerized applications will consequently have different signer information from other applications. Therefore, a message exchange will not work between applications since the applications will not have the same signer information.

SUMMARY

The exemplary embodiments provide techniques for establishing a secure exchange of data between containerized applications.

In an example embodiment, a method can include registering, by a device, a first containerized application on the device with an access server, registering, by the device, a second containerized application on the device with the access server, verifying that the first containerized application and the second containerized application are configured to exchange data, and exchanging data between the first containerized application and the second containerized application registered with the access server.

In an aspect of an embodiment, a method can include receiving an intent encryption key (IEK), a root key and a session token from the access server.

In an aspect of an embodiment, the registering the first containerized application with the access server can include generating a first public/private key and storing the first public/private key in a first keystore of the first containerized application, storing the IEK from the access server in a second keystore of the containerized application, encrypting the second keystore of the first containerized application using a public key of the generated public/private key, creating a shared application list and adding identification information of the first containerized application to the shared application list, and encrypting the shared application list.

In an aspect of an embodiment, the shared application list is encrypted using the root key from the access server.

In an aspect of an embodiment, the registering the second containerized application with the access server includes generating a second public/private key and storing the second public/private key in a first keystore of the second containerized application, storing the IEK from the access server in a second keystore of the second containerized application, encrypting the second keystore of the second containerized application using a second public key of the generated second public/private key, and decrypting the shared application list and adding identification information of the second containerized application to the shared application list.

In an aspect of an embodiment, the access server is a Mobile Security Access Server (MSAS).

In an aspect of an embodiment, the identification information of the first containerized application can include a signature and a package name of the first containerized application.

In an aspect of an embodiment, the identification information of the second containerized application can include a signature and a package name of the second containerized application.

In an aspect of an embodiment, verifying that the first containerized application and the second containerized application are configured to exchange data includes determining, by the first containerized application, that the signature and package name of the second containerized application is on the shared application list.

In an aspect of an embodiment, the exchanging data between the first containerized application and the second containerized application includes sending, by the first containerized application, an encrypted intent to the second containerized application, and decrypting, by the second containerized application, the encrypted intent, using the IEK.

In an aspect of an embodiment, the encrypted intent is an intent encrypted with a root key and a session token.

In an aspect of an embodiment, the intent includes a message package that indicates a description for an action or a topic.

In an aspect of an embodiment, the shared application list is decrypted using the root key.

In an aspect of an embodiment, a method can further include receiving, from the access server, an updated IEK, authenticating the first containerized application with the access server, and receiving, by the first containerized application, the updated IEK.

In an example embodiment, a non-transitory computer-readable storage medium storing a plurality of instructions executable by one or more processors to cause the one or more processors to perform operations can include registering, by a device, a first containerized application on the device with an access server, registering, by the device, a second containerized application on the device with the access server, verifying that the first containerized application and the second containerized application are configured to exchange data, and exchanging data between the first containerized application and the second containerized application registered with the access server.

In an example embodiment, a system can include a memory and one or more processors coupled to the memory and configured to register a first containerized application on the device with an access server, register a second containerized application on the device with the access server, verify that the first containerized application and the second containerized application are configured to exchange data, and exchange data between the first containerized application and the second containerized application registered with the access server.

Other embodiments are directed to systems, portable consumer devices, and computer readable media associated with the methods described herein.

A better understanding of the nature and advantages of exemplary embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which.

DETAILED DESCRIPTION

Figure 1:
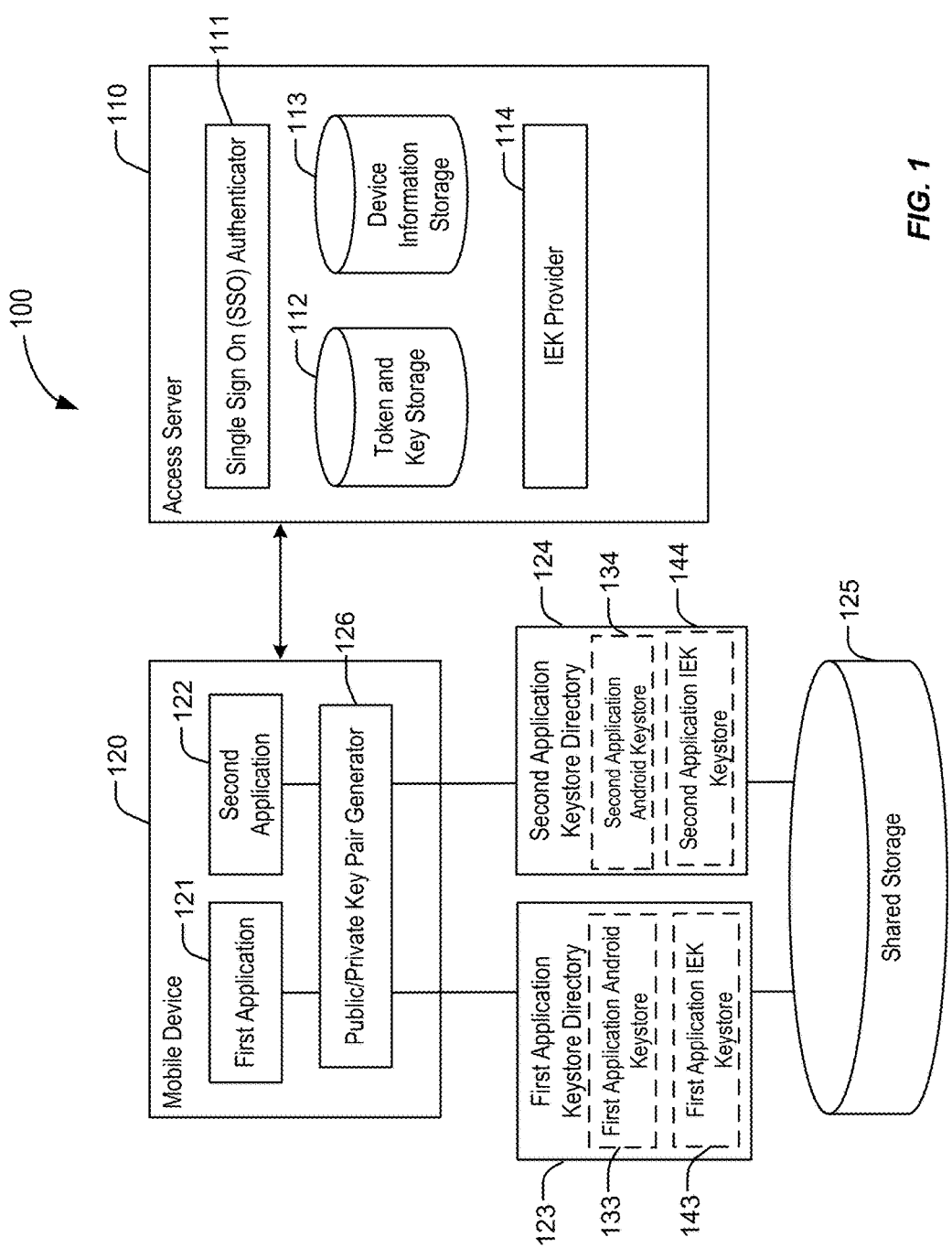
FIG. 1 illustrates a system for establishing a secure exchange of data between containerized applications, in accordance with some embodiments.

In the following description, for the purposes of explanation, specific details are set forth in order to provide a thorough understanding of the exemplary embodiments. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

The exemplary embodiments provide techniques for establishing a secure exchange of data between containerized applications. A containerized application can be an application that is configured using containerization techniques, also referred to as application sandboxing. A containerized application can be an application that is encapsulated in a container with its own operating environment. A containerized application can be an e-mail application, a document editor, business application, etc. When a containerized application is launched, an application class is initialized. Since all initialization/lifecycle methods were renamed, none of that code is executed. Instead the dummy methods (injected by containerizer) are executed. After the application class initialization, content providers are initialized and the wrapper classes (injected by containerizer) for the content providers get initialized.

Containerization is an approach to software development and mobile application management (MAM) that limits the environments in which certain code can execute. Therefore, a containerized application may be configured such that it is limited to execution in a container, or sandbox, on a device. A containerized application may be configured for execution in an environment that is isolated from other applications.

A 'containerizer' application may take a native, unmodified application as an input and outputs a containerized, modified application. For example, an ApplicationManifest.XML file and a Google Dalvik® executable (DEX) byte code file for Google Android® computer applications are extracted from a Google Android® application package (APK) file. Wrapper classes and dummy lifecycle methods are created for the Application, Content Providers, and Activities. One purpose is to create a dummy lifecycle so that no original code is executed until the authentication is done. Once authentication is done successfully, policies are fetched and applied before the actual application code is executed.

Exemplary embodiments provide security mechanisms between containerized applications. The security mechanisms may implement techniques for granting permissions between containerized applications. The security mechanism according to an exemplary embodiment can include a two-level security mechanism which includes a two-step verification process. A first step of the verification is performed at an access server level and a second step of the verification is performed at the device level. Therefore, both the server and the device would have to be compromised in order to, for example, obtain the information exchanged between the two containerized applications on the device in an unauthorized manner. For example, both the server and the device would need to be hacked.

Specifically, a device would need to be hacked in order to obtain the Intent Encryption Key (IEK). If a device is hacked, a containerized application may not work and a user cannot be authenticated with the access server. However, even if the IEK can be obtained from the access server, a hacker would additionally need the password of the user in order to obtain the root key which is used to encrypt a list of shared applications.

Therefore, security can be added to containerized applications while giving independence to different applications vendors. A third party application vendor can upload their containerized application to, for example, an application store, and an end user can install the containerized application from the application store while maintaining security.

FIG. 1 illustrates a system 100 for establishing a secure exchange of data between containerized applications, in accordance with some embodiments.

The system 100 can include a portable device, such as a mobile device 120 that can communicate with an access server 110. Although a single mobile device is shown, one or more mobiles devices can communicate with the access server 110. The access server 110 is a server computer. The access server 110 can be, for example, a Mobile Security Access Server (MSAS) or access gateway. The mobile device 120 can be, for example, a Google Android® operating system (OS)-based device, such as a mobile phone. Although an Android® operating system is disclosed, exemplary embodiments can be used in different operating systems, such as iOS®, and are not limited to an Android® operating system. The system 100 can be used in, for example, a workspace for containerized applications, such as Oracle Mobile Security Suite.

The mobile device 120 can include one or more applications. The applications can be containerized applications. As shown in FIG. 1, the mobile device 120 includes a first application 121 and a second application 122. Although two applications are shown in the figure, the mobile device can include more than two or less than two applications.

The mobile device 120 can include a public/private key generator 126. The public/private key generator 126 can be used to generate a public/private key pair for the first application 121 and the second application 122.

Each of the applications can have a corresponding keystore. A keystore can be, for example, a repository of security certificates, such as authorization certificates or public key certificates. The first application 121 can include a first application keystore directory 123 and the second application 122 can include a second application keystore directory 124. The first application keystore directory 123 and the second application keystore directory 124 can include one or more keystores. An Android® keystore is a keystore provided by an Android System. Each of the applications can store key pairs which are accessible only to the application which stores the key pair. For example, a keystore in first application keystore directory 123 can be a first application Android® keystore 133 that is accessible only by first application 121 (e.g. first keystore for the first application). Further, a keystore in second application keystore directory 124 can be a second application Android® keystore 134 that is accessible only by second application 122 (e.g. first keystore for the second application). The Android® keystores 133 and 134 can store, for example, a public/private key pair generated by the public/private key pair generator 126. Although Android® keystores are described, this is merely an example, and the keystore can be for different operating systems.

Additionally, a keystore in first application keystore directory 123 can include an first application IEK keystore 143 that is accessible only by first application 121 (e.g. second keystore for the first application). The second keystore for the first application can be stored in a shared file and the shared filed can be encrypted using a root key. Further, a keystore in second application keystore directory 124 can include a second application IEK keystore 144 that is accessible only by second application 122 (e.g. second keystore for the second application).

After an application is registered with an access server, the application can store their package name and signature in a shared application list. The shared application list can be shared by the authenticated and registered applications on the mobile device. The shared application list can be stored on a shared storage 125. The shared storage 125 can be located external to the mobile device and can be accessed by one or more applications.

The access server 110 can be, for example, an Mobile Security Access Server (MSAS). The access server can provide access one or more resources. Access server 110 can include or be communicatively coupled to an access management system, such Oracle Access Manager, which can implement a SSO service. In some embodiments, access server 110 can include a single sign-on authenticator 111, which can establish an SSO session to provide SSO access to one or more resources. The access server 110 enables all of the containerized application in a workspace to talk inside a local area network (LAN) of a user. For example, the access server 110 can call entities on the Internet. All of the applications in the system can communicate with the access server 110.

The access server 110 can also include a token and key storage 112 and a device information storage 113. The token and key storage 112 can store, for example a session token and a root key. The device information storage 113 can store, for example, a serial number of a device, such as a serial number for mobile device 120.

The access server 110 can also include an IEK provider 114. An IEK can be an encryption key for an intent. An intent provides a facility for performing late runtime binding between the code in different applications. Further, an intent can be used to launch activities. An intent can be a passive data structure that holds a description of an action to be performed. An intent is a messaging object that can be used to request an action from another application component. An intent can facilitate communication between components in several ways. The IEK provider 114 can provide an IEK for an intent.

A. Registration of a First Containerized Application

Figure 2:
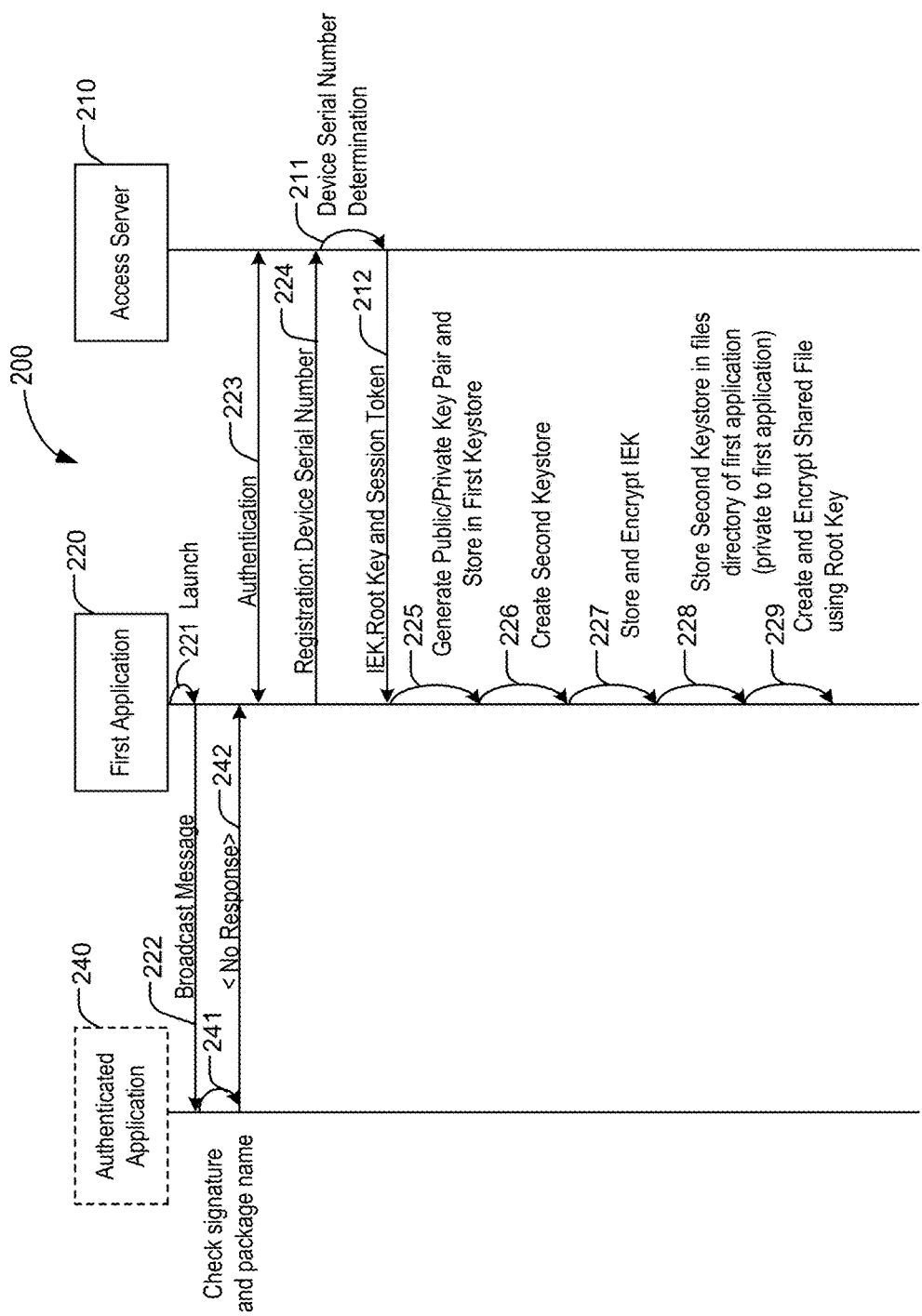
FIG. 2 illustrates a sequence diagram of registering a first containerized application with an access server, in accordance with some embodiments.

FIG. 2 illustrates a sequence diagram of registering a first containerized application with an access server, in accordance with some embodiments.

The sequence 200 can be performed by, for example, a first application 220, which is a containerized application, an access server 210 and an authenticated application 240. The elements of FIG. 2 may be similar to those described above with respect to FIG. 1. For example, the access server 210 can correspond to, for example, the access server 110 as described in FIG. 1. The first application 220 and authenticated application 240 can be stored on a mobile device, such as mobile device 120. The authenticated application 240 can include other applications on the mobile device that have been authenticated by the access server 210. There maybe be applications that have been previously authenticated (e.g. authenticated application 240) by the access server 210 and there may not be any previously authenticated applications. Therefore, there may not be any previously authenticated applications 240.

The elements shown in FIG. 2 are merely examples and there can be more than one authenticated application. Further, although the applications are referred to as a first application and a second application, this does not indicate any order and a second application can be a first application.

At step 221, the first application 220 stored on a mobile device is launched. When the first application 220 is launched on the mobile device, the mobile device will request the request the user of the mobile device to authenticate themselves with the access server 210. For example, the user will be asked to enter a user name and a password on a user interface of the mobile device. If the user is authenticated, then the user can access the first application and the data in the first application. When the first application 220 is launched, it will send a broadcast message at step 222 to applications which have been authenticated and have already been registered by the access server 210. For example, the first application 220 can send a broadcast message to authenticated application 240 if an authenticated application 240 exists on the mobile device.

The broadcast message is a message on a particular action or topic. Therefore, applications that are interested in the topic can listen to the message. A topic can include, for example, a radio station identifier FM 100 or FM 89.1. The broadcast message can be a message asking for a session token and a root key from any application that is authenticated with the access server 210.

At step 241, the authenticated application 240 will check the signature and package name of the first application 220 in a shared file. The authenticated application 240 can receive the broadcast since it is registered on a same custom action. If the authenticated application 240 is not registered on a same custom action, then the authenticated application 240 will not receive the broadcast from first application 220. If the authenticated application 240 is registered on a same custom action, then the authenticated application 240 can respond to the broadcast.

The authenticated application 240 will determine whether the signature and package name of the first application 220 is present in a previously created file that is stored in a shared location. The file can be stored in, for example, the shared storage 125. If the signature and package name of the first application 220 is not present in the file, then the authenticated application will not send a response to the first application 220, as shown at step 242.

If a response is not received from any authenticated applications, at step 223 authentication will be performed. The user of the mobile device will be presented with an authentication screen can and can be requested to enter a user name and password on a user interface of the mobile device.

After the first application 220 is authenticated with the access server 210, at step 224, registration will be performed. When the first application 220 registers itself on the access server 210, the first application 220 will provide its device serial number to the access server 210. The device serial number can be for example, unique numerical information that can be used to distinguish the device from other devices.

At step 211, the access server 210 determines whether there are any other applications from the mobile device. For example, the access server can determine whether there are any other applications from the mobile device according to the device serial number. If the device serial number is present on the access server 210, at step 212, the access server 210 will send the intent encryption key (IEK) for the device. If the device serial number is not present, then the access server 210 will first generate an IEK for the device and will then send the generated IEK at step 212. The IEK can be a key such as a 256-bit encryption key.

At step 212, the access server 210 sends a root key and a session token in addition to the IEK. The session token can be a token that is provided by the access server 210, such as an authentication cookie. Further, a session token can include a signature, a user name, an ID, a date, etc. Also, a session token can include a random string of text. A root key can be a master key for encryption of a keystore of an application. The root key or master key can be used to encrypt a keystore.

When the first application 220 receives the IEK, the root key and the session token, at step 225, the first application 220 can generate a public/private key pair and the generated public/private key pair is stored in a first keystore for the first application, such as in first application Android® keystore 133. The first keystore for the first application (e.g., first application Android® keystore 133) can only be accessed by the first application. Each application can have its own Android® keystore. When an application is installed on, for example, an Android® device, the application will be designated a private area on the device, from the storage, that only that application can access. The designated private area can be the first application Android® keystore 133.

At step 226, a second keystore for the first application 220 (e.g., first application IEK keystore 143) is generated. At step 227, the IEK received from the access server 210 is encrypted using the public key generated at step 225. The encrypted IEK is then stored in the second keystore of the first application 220 (e.g., first application IEK keystore 143). The second keystore of the first application (e.g., first application IEK keystore 143) can be accessed only by the first application 220.

The second keystore, which includes the encrypted IEK, is then stored in a files directory at step 228. The files directory can be accessed only by the first application 220 and is private to the first application 220.

At step 229, a file, such as a shared application list, can be created in a shared location and encrypted. The file can include a package name (e.g. Gmail) and signature (e.g. data signature). The file can be encrypted using the root key received at step 212.

Additional applications can be stored on a mobile device. The additional applications can communicate with applications that have been previously authenticated and registered with the access server. However, before an application can communicate with other authenticated applications on the device, the application should also be registered with the access server.

B. Registration of a Second Containerized Application

Figure 3:
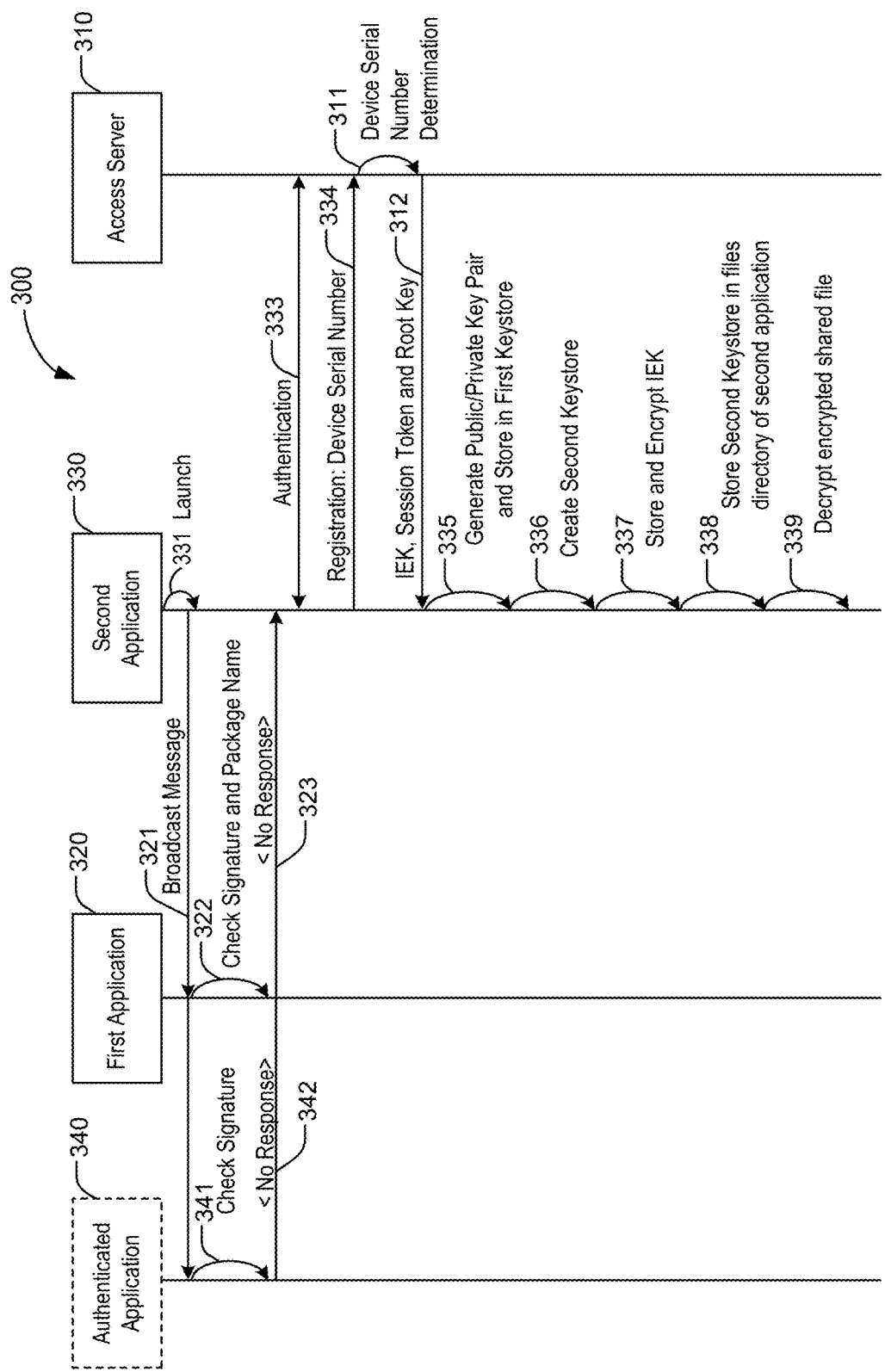
FIG. 3 illustrates a sequence diagram of registering a second containerized application with an access server, in accordance with some embodiments.

FIG. 3 illustrates a sequence diagram of registering a second containerized application 330 with an access server 310, in accordance with some embodiments.

The sequence 300 can be performed by, for example, a first application 320, a second application 330, an access server 310 and an authenticated application 340. The first application 320, second application 330, and authenticated application 340 can be stored on a mobile device, such as mobile device 120. The first application 320 and the second application 330 are containerized applications. The first application 320 has previously been authenticated and registered as described with respect to FIG. 2. Therefore, the first application 320 is an authenticated application. The authenticated application 340 can include other applications on the mobile device that have been authenticated by the access server 310. There maybe be applications that have been previously authenticated (e.g. authenticated application 340) by the access server 310 and there may not be any previously authenticated applications other than, for example, the first application 330. The elements shown in FIG. 3 are merely examples and there can be one or more authenticated applications.

At step 331, the second application 330 stored on a mobile device is launched. When the second application 330 is launched on the mobile device, the mobile device will request the user of the mobile device to authenticate themselves with the access server 310. If the user is authenticated, then the user can access the second application and the data in the second application. When the second application 330 is launched, it will send a broadcast message at step 321 to applications which have been authenticated and registered by the access server 310. For example, the second application 330 can send a broadcast message to first application 320 and authenticated application 340. A broadcast message can be a message asking for a session token and a root key from any application that is authenticated with the access server 310.

At step 341 and at step 322, the authenticated application 340 and the first application 320 will check the signature and package name of the second application 330. In the example shown in FIG. 3, the first application 320 and the authenticated application 340 can receive the broadcast since they are registered on a same custom action. If the first application 320 and the authenticated application 340 are not registered on a same custom action, then the first application 320 and the authenticated application 340 will not receive the broadcast from second application 330.

The first application 320 and the authenticated application 340 will determine whether the signature and package name of the second application 330 is present in the file (e.g. shared application list) that is created and stored in a shared location. The file that is created and stored in the shared location can correspond to, for example, the file that was created in step 229 of FIG. 2. The shared location can be, for example, shared storage 125. If the signature and package name of the second application 330 is not present in the file in the shared storage, then the first application 320 and/or the authenticated application 340 will not send a response to the second application 330, as shown at step 342 and step 323.

For example, if the signature and package name of the second application 330 is not present in the file in the shared storage that was created in step 229 of FIG. 2, then the first application 320 will not send a response to the second application 330, as shown at step 323. If the second application 330 is registered on a same custom action, then the first application 320 and/or the authenticated application 340 may be able to respond to the broadcast.

If a response is not received from any authenticated applications, such as authenticated application 340 and first application 320, at step 333 authentication will be performed. The user of the mobile device will be presented with an authentication screen. For example, a user can be requested to enter a username and password.

After the second application 330 is authenticated with the access server 310, at step 334, registration will be performed. When the second application 330 registers itself on the access server 310, the second application 330 will provide its device serial number to the access server 310. The device serial number can be for example, unique numerical information that can be used to distinguish the device from other devices.

At step 311, the access server 310 determines whether there are any other applications from the device. For example, the access server can determine whether there are any other applications from the mobile device according to the device serial number. If the device serial number is present on the access server 310, at step 312, the access server 310 will send the intent encryption key (IEK) for the device. If the device serial number is not present, then the access server 310 will first generate an IEK for the device and will then send the generated IEK at step 312. At step 312, the access server 310 sends a root key and a session token in addition to the IEK.

When the second application 330 receives the IEK, the root key and the session token, at step 335, the second application 330 can generate a public/private key pair and the generated public/private key pair is stored in a first keystore for the second application (e.g., second application Android® keystore 134). The first keystore for the second application (e.g., second application Android® keystore 134) can only be accessed by the second application. Each application can have its own Android® keystore.

At step 336, a second keystore for the second application 330 (e.g., second application IEK keystore 144) is generated. At step 337, the IEK received from the access server 310 is encrypted using the public key generated at step 335. The encrypted IEK is then stored in the second keystore of the second application 330 (e.g., second application IEK keystore 144). The second application IEK keystore 144 can be accessed only by the second application 330.

The keystore (e.g., second application IEK keystore 144), which includes the encrypted IEK, is then stored in a directory, such as a files directory, at step 338. The directory can be accessed only by the second application 330.

At step 339, the file, such as the shared application list that was previously created (e.g. Step 229 of FIG. 2), can be retrieved by the second application. The second application can decrypt the file using the root key received at step 312 and the second application can add its package name and signature information to the shared application list. The second application can then encrypt the shared application list using the root key.

Therefore, any messages that are shared between the first application and the second application will be encrypted using the IEK. Further, the first application or the second application that receives a messages can decrypt the message using the IEK.

In accordance with an exemplary embodiment, authentication for fetching the IEK is initially performed. Any further authentications, after the authentication for fetching the IEK, can trigger a single-sign on (SSO) between authenticated applications, such as between the first application and the second application. Since both applications are registered to the same access server, and at least one of the applications has already been authenticated and holds the session token and intent encryption key (IEK), SSO can be performed between the applications.

C. Launch a Registered Containerized Application

Figure 4:
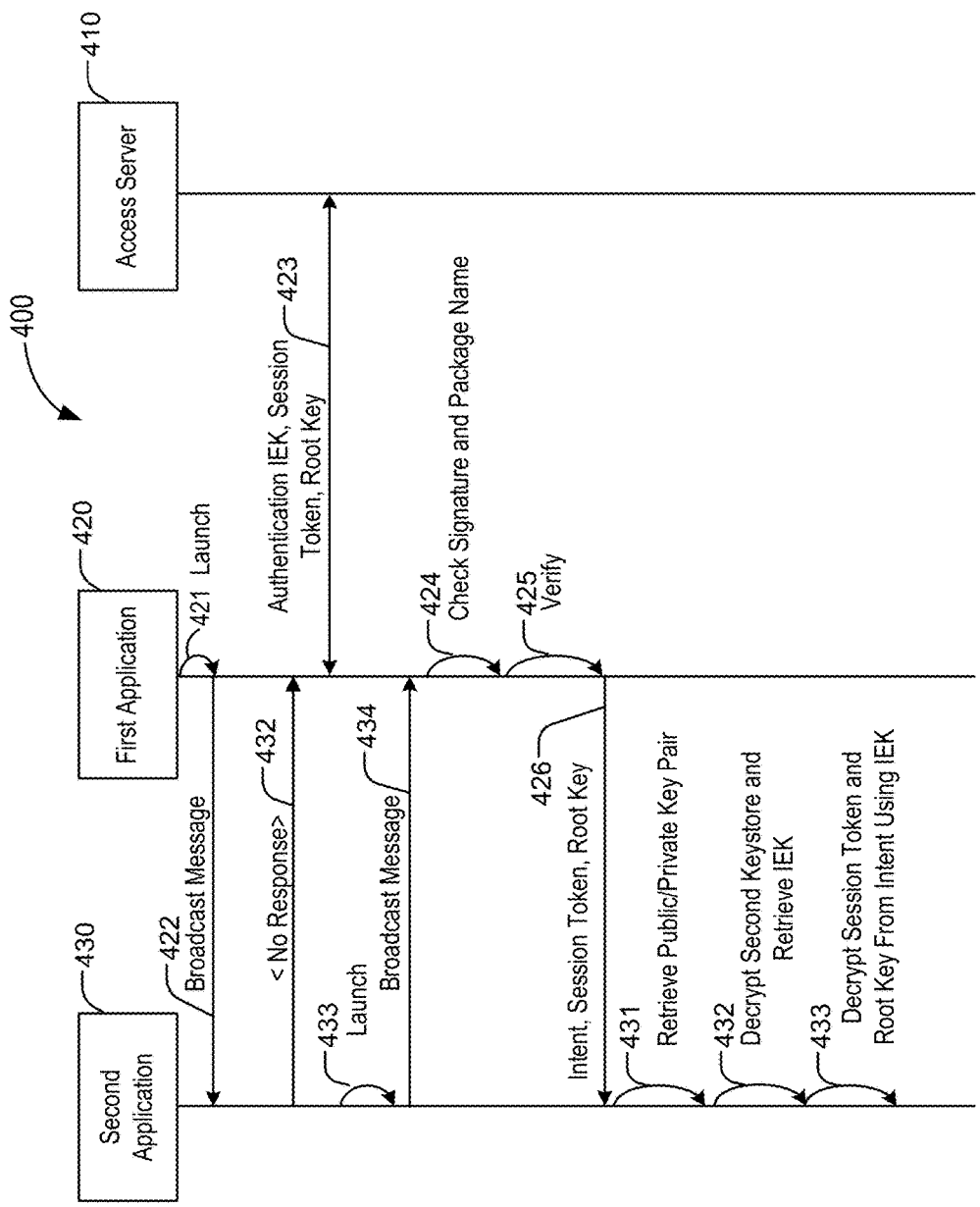
FIG. 4 illustrates a sequence diagram of launching a registered containerized application, in accordance with some embodiments.

FIG. 4 illustrates a sequence diagram of launching a registered containerized application, in accordance with some embodiments.

The sequence 400 can be performed by, for example, a first application 420, a second application 430, and an access server 410. The first application 420 and the second application 430 are containerized applications. Further, the first application 420 and the second application 430 can be stored on a mobile device, such as mobile device 120. The first application 420 and the second application 430 have been authenticated and registered as described with respect to FIG. 2 and FIG. 3. Therefore, the first application 420 and the second application 430 are authenticated applications. Although first application 420 and the second application 430 are shown as authenticated applications, there can be other authenticated applications on the mobile device. Therefore, there may be additional applications that have been previously authenticated by the access server 310. The elements shown in FIG. 4 are merely examples.

At step 421, the first application 420 stored on a mobile device is launched. After the first application 420 is launched, at step 422, the first application 420 will send a broadcast message to applications which have been authenticated and registered by the access server 410. For example, the first application 420 can send a broadcast message to a second application 430. The second application 430 can be authenticated as described in FIG. 3.

The broadcast message can be a message asking for a session token and a root key from any application that is authenticated with the access server 410.

If, at step 432, a response is not received from any authenticated applications, such as from second application 430, at step 423 authentication will be performed. The user of the mobile device will be presented with an authentication screen. For example, the user can be prompted to enter a user name and password on a user interface of the device. After authentication, the IEK, session token and root key are fetched from the access server.

If, at step 433, the second application 430 is launched, at step 434 the second application will send a broadcast message to applications which have been authenticated by the access server 410. For example, the second application 430 can send a broadcast message to the first application 420. The first application 420 can be authenticated as described in FIG. 2.

The broadcast message can be a message asking for a session token and a root key from any application that is authenticated with the access server 410.

At step 424 the first application can check the package name and signature for the second application 430. The first application can check the package name and signature for the second application 430 by decrypting the shared file or shared application list, by using the root key.

At step 425, the first application 420 can verify that the second application 430 is a trusted application. After verifying that the second application 430 is a trusted application, the first application 420 can prepare an intent along with the root key and the session token encrypted by the IEK. The intent, root key and session token can be broadcast to the second application 430 at step 426.

After the second application 430 receives the intent, at step 431, the second application 430 retrieves its generated public/private key pair from the first keystore of the second application 430 (e.g., second application Android® keystore 134). An Android® keystore can be a system provided, hardware-backed keystore. Therefore, keys security can be guaranteed at a hardware level. Therefore, they do not need to be decrypted since keys of one application are not accessible to keys of another application.

At step 432, the second application 430 decrypts the second keystore of the second application 430 having the IEK (e.g., second application IEK keystore 144) by using the public/private key pair retrieved from the first keystore of the second application 430 (e.g., second application Android® keystore 134). After decrypting the second keystore of the second application 430 (e.g., second application IEK keystore 144), the second application 430 can then retrieve the IEK from the second keystore (e.g., second application IEK keystore 144).

At step 433, the second application 430 decrypts the session token and root key from the intent using the IEK. Therefore, the second application 430 can access the information in the intent and information can be exchanged between the applications.

D. Update an Intent Encryption Key (IEK)

Figure 5:
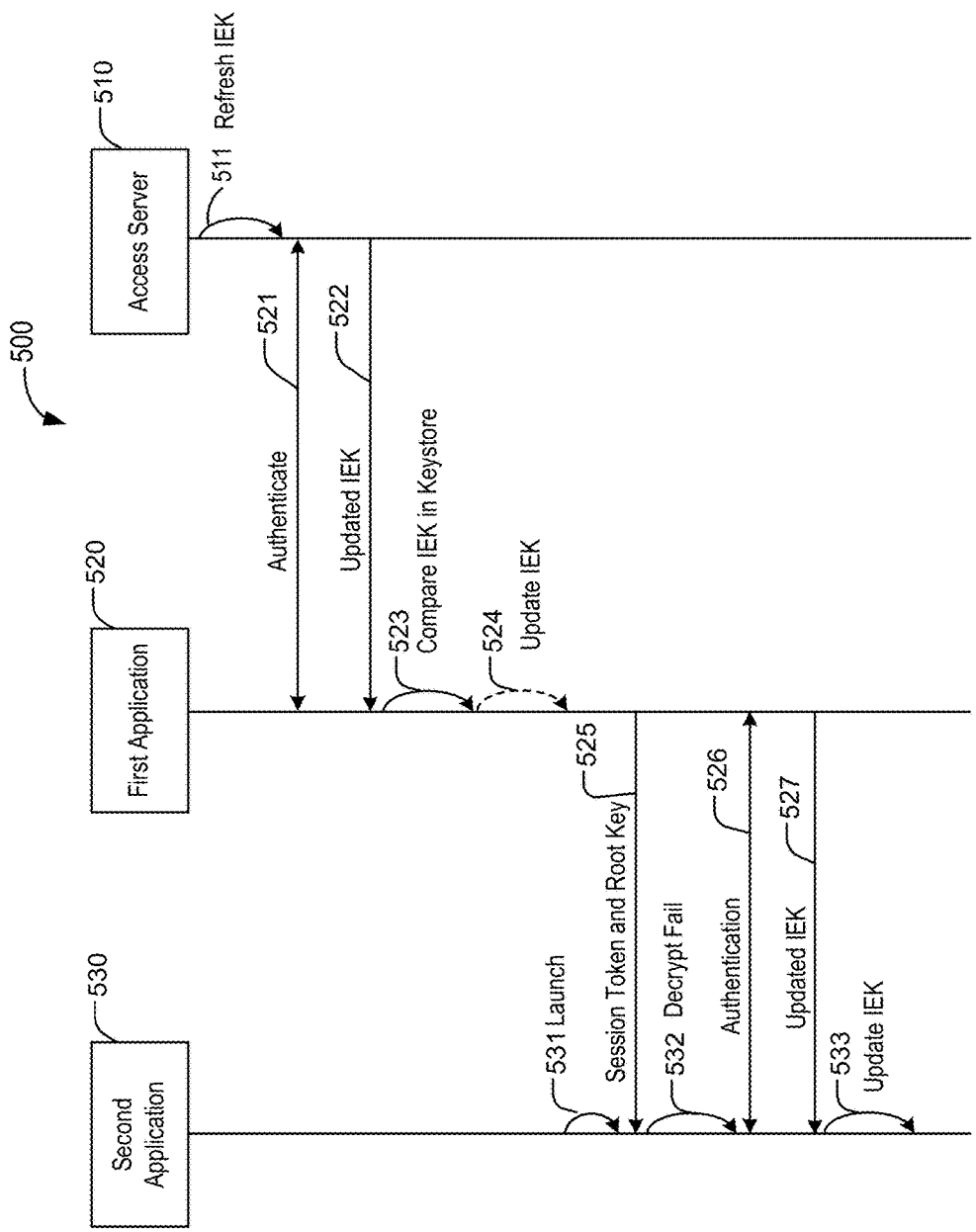
FIG. 5 illustrates a sequence diagram of refreshing and/or changing an Intent Encryption Key (IEK), in accordance with some embodiments.

FIG. 5 illustrates a sequence diagram of refreshing and/or changing an IEK, in accordance with some embodiments.

The sequence 500 can be performed by, for example, a first application 520, a second application 530, and an access server 510. The first application 520 and the second application 530 are containerized applications. Further, the first application 520 and the second application 530 can be stored on a mobile device, such as mobile device 120. The first application 520 and the second application 530 have been authenticated and registered as described with respect to FIG. 2 and FIG. 3. Therefore, the first application 520 and the second application 530 are authenticated applications. Although the first application 520 and the second application 530 are shown as authenticated applications, there can be other authenticated applications on the mobile device. Therefore, there may be additional applications that have been previously authenticated by the access server 510 and there may not be any previously authenticated applications. The elements shown in FIG. 5 are merely examples.

An IEK can be changed at the access server 510. For example, an IEK can be changed if the IEK has been comprised and is, for example, no longer secure. Alternatively, as an additional security measure, an IEK can be routinely updated. Therefore, an IEK can be updated, for example, every week or every two weeks.

If the IEK is changed, the access server 510 can communicate the new IEK to the authenticated and registered containerized applications on the system. For example, the access server 510 can communicate the new IEK to the first application 520, which can subsequently provide the new IEK to the second application 530.

As step 511, the access server 510 can update the IEK. At step 521 the first application can authenticate itself with the access server 510. After successful authentication, at step 522, the first application 520 can receive an IEK from the access server 510. The IEK received from the access server can be an updated IEK.

At step 523, the first application will compare the IEK received from the access server with the IEK currently stored in the second keystore of the first application (e.g., first application IEK keystore 143). If the IEK received from the access server 510 is different from the IEK currently stored in the second keystore of the first application (e.g., first application IEK keystore 143), then at step 524 the IEK stored in the second keystore can be updated. However, if the IEK received from the access server 510 is the same as that which is currently stored in the second keystore of the first application, then the IEK may not be updated.

If, at step 531, the second application 530 is launched, the second application 530 can receive the intent, session token and root key from the first application 520. The second application 530 can receive the session token and root key from the first application 520 since it is in the shared list of trusted applications. However, the second application 530 will not be able to decrypt the intent since it has been encrypted using the updated IEK. Therefore, at step 532 the decryption will fail.

After the decryption fail, at step 526, an authentication screen will be provided on the second application 530. When the second application 530 performs authentication, the second application 530 can retrieve the updated IEK and can store the updated IEK in the second keystore of the second application 530 at step 533. Therefore, the second application 530 will then have the updated IEK.

E. Method of Registering and Launching an Application

Figure 6:
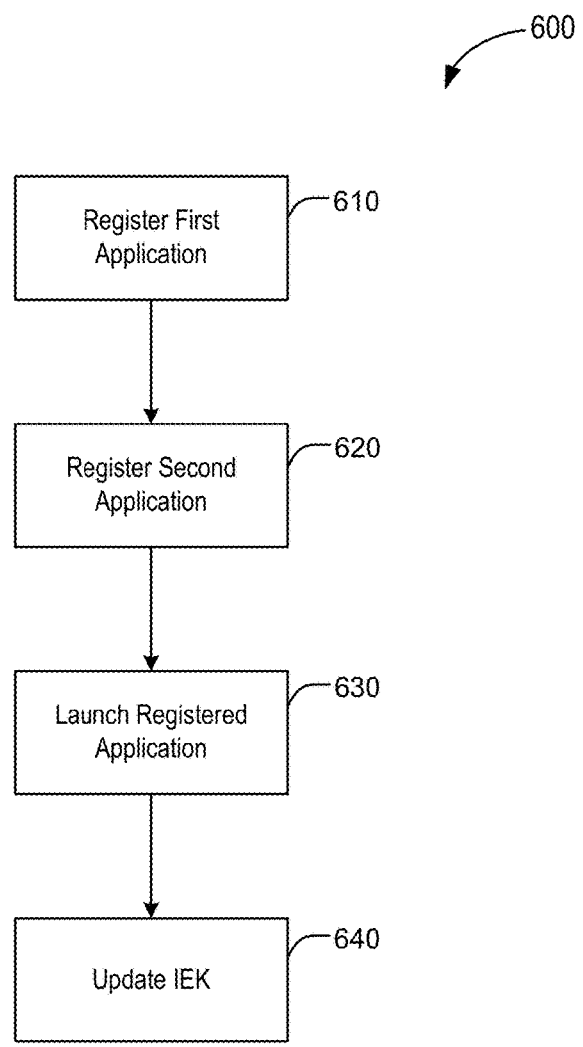
FIG. 6 illustrates a flowchart establishing a secure exchange of data between containerized applications, in accordance with some embodiments.

FIG. 6 illustrates a flowchart of a method 600 for establishing a secure exchange of data between containerized applications, in accordance with some embodiments.

At step 610, a first containerized application can be registered with an access server. As discussed above, before a first containerized application can exchange information with other applications on the mobile device, the first containerized application is registered with the access server.

Further, in order for any applications which are added to the device, to communicate with applications that are currently authenticated and registered with the device, they should also be authenticated and registered with the access server. Therefore, at step 620, a second containerized application, for example, can be registered with the access server.

At step 630, a registered application, such as a first application and a second application, can be launched. Data, such as an intent, can be exchanged between applications which have been authenticated with the access server.

At step 640, an intent encryption key (IEK) can be updated. For example, if an IEK is changed because it has been compromised, or if the IEK is changed because of a routine update, then the updated IEK can be shared between the authenticated applications.

F. Computer System

Figure 7:
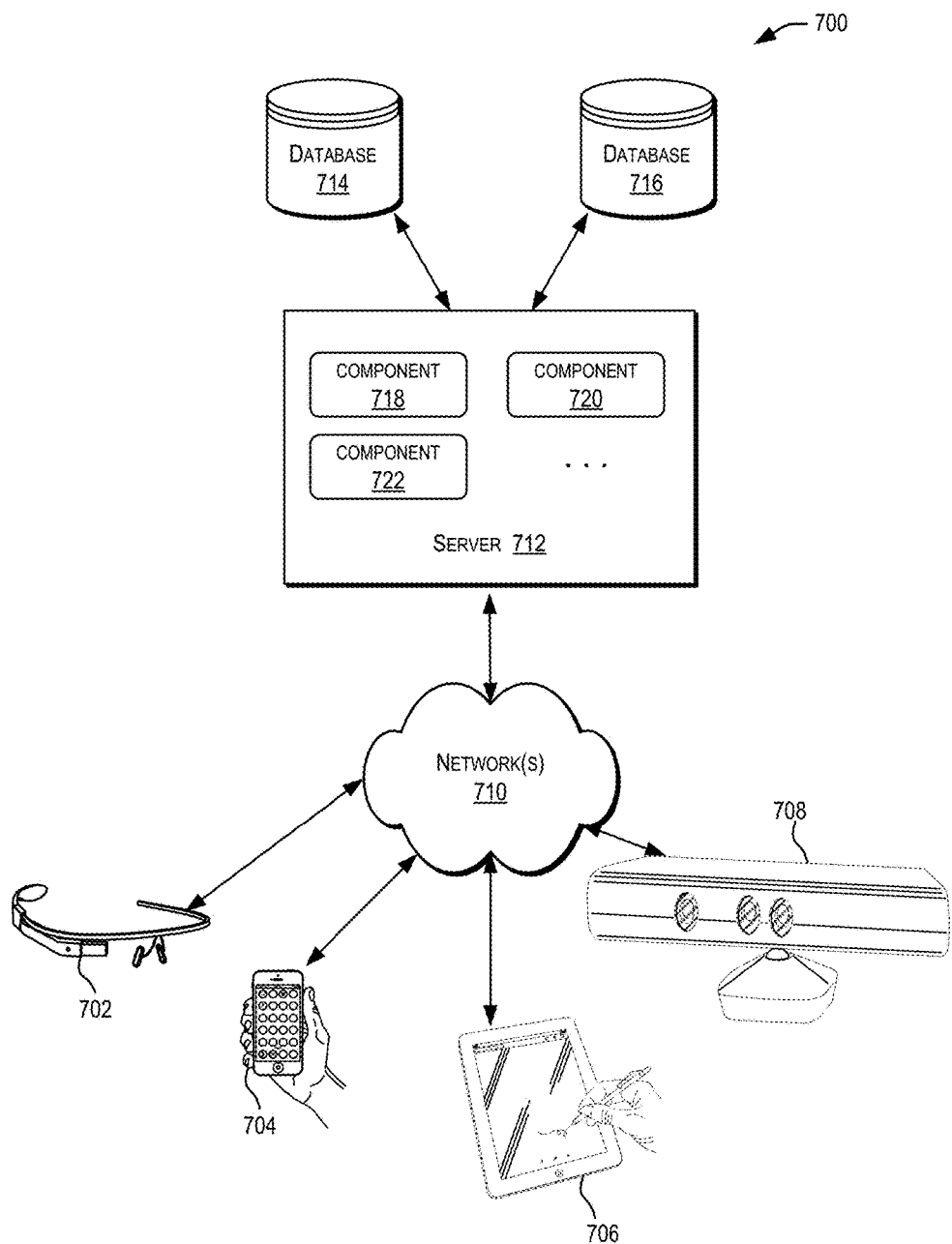
FIG. 7 depicts a simplified diagram of a distributed system for implementing some embodiments.

FIG. 7 depicts a simplified diagram of a distributed system 700 for implementing some embodiments. In the illustrated embodiment, the distributed system 700 includes one or more client computing devices 702, 704, 706, and 708, which are configured to execute and operate a client application such as a web browser, proprietary client (e.g., Oracle Forms), or the like over one or more network(s) 710. The server 712 may be communicatively coupled with the remote client computing devices 702, 704, 706, and 708 via network 710.

In various embodiments, the server 712 may be adapted to run one or more services or software applications such as services and applications that provide message delivery services. In certain embodiments, the server 712 may also provide other services or software applications can include non-virtual and virtual environments. In some embodiments, these services may be offered as web-based or cloud services or under a Software as a Service (SaaS) model to the users of the client computing devices 702, 704, 706, and/or 708. Users operating the client computing devices 702, 704, 706, and/or 708 may in turn utilize one or more client applications to interact with the server 712 to utilize the services provided by these components.

In the configuration depicted in FIG. 7, the software components 718, 720 and 722 of system 700 are shown as being implemented on the server 712. In other embodiments, one or more of the components of the system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in FIG. 7 is thus one example of a distributed system for implementing an embodiment system and is not intended to be limiting.

The client computing devices 702, 704, 706, and/or 708 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 710.

Although distributed system 700 in FIG. 7 is shown with four client computing devices, any number of client computing devices may be supported. Other devices, such as devices with sensors, etc., may interact with the server 712.

The network(s) 710 in the distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 710 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 712 can include one or more virtual machines running virtual operating systems, or other computing architectures involving virtualization. One or more flexible pools of logical storage devices can be virtualized to maintain virtual storage devices for the server. Virtual networks can be controlled by the server 712 using software defined networking. In various embodiments, the server 712 may be adapted to run one or more services or software applications described in the foregoing disclosure. For example, the server 712 may correspond to a server for performing processing as described above according to some embodiments of the present disclosure.

The server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 712 may include one or more applications to analyze and consolidate data feeds and/or event updates received from users of the client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 712 may also include one or more applications to display the data feeds and/or real-time events via one or more display devices of the client computing devices 702, 704, 706, and 708.

The distributed system 700 may also include one or more databases 714 and 716. These databases may provide a mechanism for storing information such as inventory information, and other information used by example embodiments. Databases 714 and 716 may reside in a variety of locations. By way of example, one or more of databases 714 and 716 may reside on a non-transitory storage medium local to (and/or resident in) the server 712. Alternatively, the databases 714 and 716 may be remote from the server 712 and in communication with the server 712 via a network-based or dedicated connection. In one set of embodiments, the databases 714 and 716 may reside in a storage-area network (SAN). Similarly, any necessary files for performing the functions attributed to the server 712 may be stored locally on the server 712 and/or remotely, as appropriate. In one set of embodiments, the databases 714 and 716 may include relational databases, such as databases provided by Oracle, that are adapted to store, update, and retrieve data in response to SQL-formatted commands.

Figure 8:
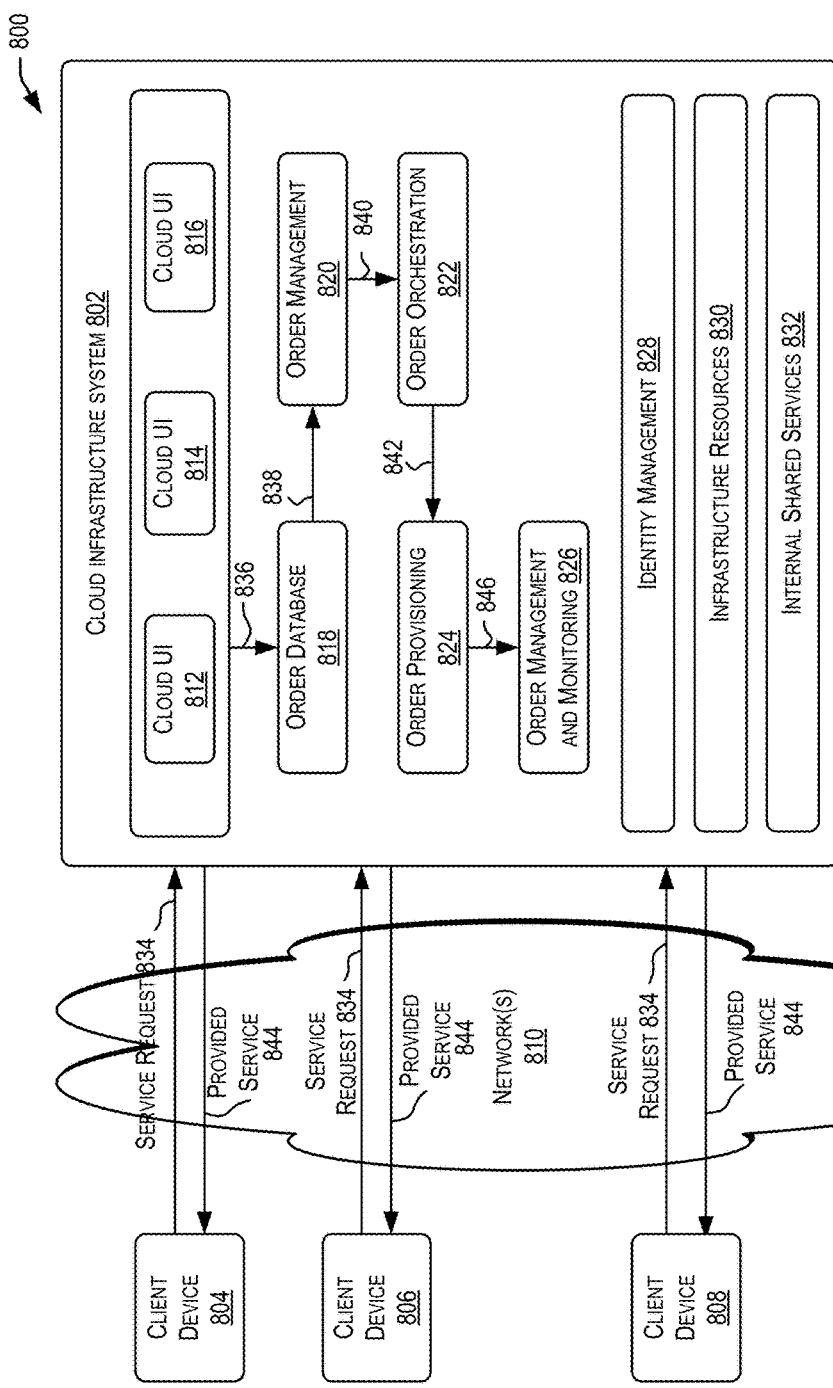
FIG. 8 illustrates a simplified block diagram of one or more components of a system environment in which services may be offered as cloud services, in accordance with some embodiments.

In some embodiments, the message delivery services described above may be offered as services via a cloud environment. FIG. 8 illustrates a simplified block diagram of one or more components of a system environment in which services may be offered as cloud services, in accordance with some embodiments.

In the illustrated embodiment in FIG. 8, system environment 800 includes one or more client computing devices 804, 806, and 808 that may be used by users to interact with a cloud infrastructure system 802 that provides cloud services, including services for dynamically modifying documents (e.g., webpages) responsive to usage patterns. Cloud infrastructure system 802 may comprise one or more computers and/or servers that may include those described above for server 712.

It should be appreciated that cloud infrastructure system 802 depicted in FIG. 8 may have other components than those depicted. Further, the embodiment shown in FIG. 8 is only one example of a cloud infrastructure system that may incorporate some of the embodiments. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708. Client computing devices 804, 806, and 808 may be configured to operate a client application such as a web browser, a proprietary client application (e.g., Oracle Forms), or some other application, which may be used by a user of the client computing device to interact with cloud infrastructure system 1302 to use services provided by cloud infrastructure system 802. Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 710.

In certain embodiments, services provided by cloud infrastructure system 802 may include a host of services that are made available to users of the cloud infrastructure system on demand. In addition to services related to account management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 802 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of some embodiments to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle Corporation) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform, and other resources.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 to enable provision of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in FIG. 8, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In an exemplary operation, at 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI) such as cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

At 836, the order information received from the customer may be stored in an order database 818. If this is a new order, a new record may be created for the order. In one embodiment, order database 818 can be one of several databases operated by cloud infrastructure system 818 and operated in conjunction with other system elements.

At 838, the order information may be forwarded to an order management module 820 that may be configured to perform billing and accounting functions related to the order, such as verifying the order, and upon verification, booking the order.

At 840, information regarding the order may be communicated to an order orchestration module 822 that is configured to orchestrate the provisioning of services and resources for the order placed by the customer. In some instances, order orchestration module 822 may use the services of order provisioning module 824 for the provisioning. In certain embodiments, order orchestration module 822 enables the management of business processes associated with each order and applies business logic to determine whether an order should proceed to provisioning.

As shown in the embodiment depicted in FIG. 8, at 842, upon receiving an order for a new subscription, order orchestration module 822 sends a request to order provisioning module 824 to allocate resources and configure resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. This enables order orchestration module 824 to be isolated from implementation details, such as whether or not services and resources are actually provisioned on the fly or pre-provisioned and only allocated/assigned upon request.

At 844, once the services and resources are provisioned, a notification may be sent to the subscribing customers indicating that the requested service is now ready for use. In some instance, information (e.g. a link) may be sent to the customer that enables the customer to start using the requested services.

At 846, a customer's subscription order may be managed and tracked by an order management and monitoring module 826. In some instances, order management and monitoring module 826 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 800 may include an identity management module 828 that is configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
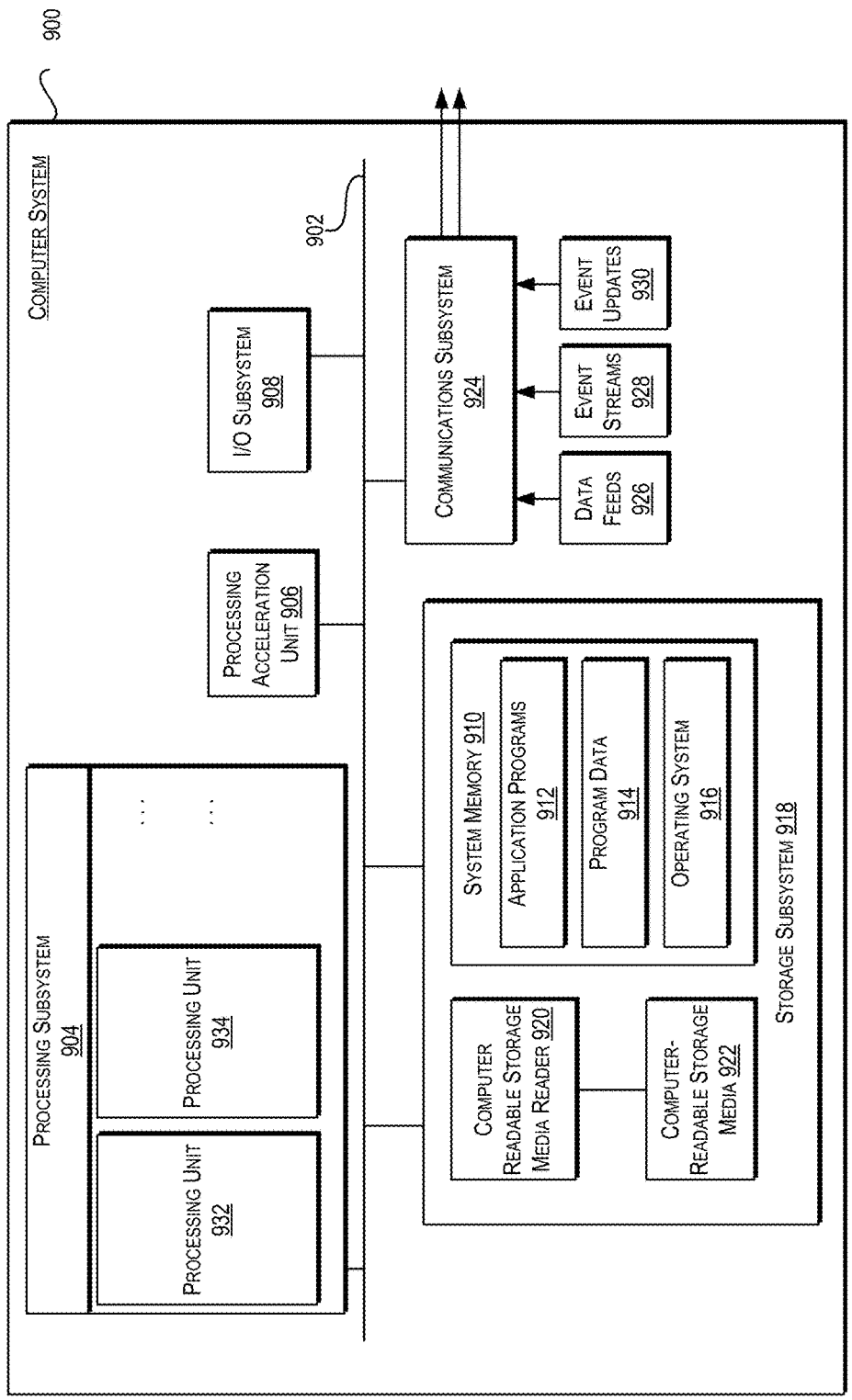
FIG. 9 illustrates an exemplary computer system that may be used to implement certain elements, according to some embodiments.

FIG. 9 illustrates an exemplary computer system that may be used to implement certain elements, according to some exemplary embodiments. In some embodiments, computer system 900 may be used to implement any of the various servers and computer systems described above. As shown in FIG. 9, computer system 900 includes various subsystems including a processing subsystem 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 910 including potentially on one or more storage devices. Through suitable programming, processing subsystem 904 can provide various functionalities described above for dynamically modifying documents (e.g., webpages) responsive to usage patterns.

In certain embodiments, a processing acceleration unit 906 may be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term "input device" is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 900. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used in accordance with the example embodiments.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 9, system memory 910 may store application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 922 may store programming and data constructs that provide the functionality of some embodiments. Software (programs, code modules, instructions) that when executed by processing subsystem 904 a processor provide the functionality described above may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 922 may provide storage of computer-readable instructions, data structures, program modules, and other data for computer system 900.

In certain embodiments, storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, computer system 900 may provide support for executing one or more virtual machines. Computer system 900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 900. Accordingly, multiple operating systems may potentially be run concurrently by computer system 900. Each virtual machine generally runs independently of the other virtual machines.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific example embodiments have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while example embodiments have been described using a particular combination of hardware and software, it should be recognized that other combinations of hardware and software are also within the scope of the example embodiments. Some of the example embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific example embodiments have been described, these are not intended to be limiting. Various modifications and equivalents are within the scope of the following claims.

What is claimed is:

1. A method comprising:
   registering, by a device, a first containerized application on the device with an access server, wherein the registering the first containerized application with the access server comprises:
   generating a first public/private key and storing the first public/private key in a first keystore of the first containerized application on the device;
   storing an intent encryption key (IEK) from the access server in a second keystore of the first containerized application on the device, wherein the second keystore of the first containerized application is different from the first keystore of the first containerized application;
   encrypting the second keystore of the first containerized application using a public key of the generated first public/private key,
   wherein the first keystore and the second keystore are accessible only by the first containerized application;
   registering, by the device, a second containerized application on the device with the access server;
   verifying that the first containerized application and the second containerized application are configured to exchange data; and
   exchanging data between the first containerized application and the second containerized application registered with the access server.

2. The method according to claim 1, further comprising receiving an intent encryption key (IEK), a root key and a session token from the access server.

3. The method according to claim 2, wherein the registering the first containerized application with the access server further comprises:
   creating a shared application list and adding identification information of the first containerized application to the shared application list; and
   encrypting the shared application list.

4. The method according to claim 3, wherein the shared application list is encrypted using the root key from the access server.

5. The method according to claim 3, wherein the registering the second containerized application with the access server comprises:
   generating a second public/private key and storing the second public/private key in a first keystore of the second containerized application;
   storing the IEK from the access server in a second keystore of the second containerized application;
   encrypting the second keystore of the second containerized application using a second public key of the generated second public/private key; and
   decrypting the shared application list and adding identification information of the second containerized application to the shared application list.

6. The method according to claim 3, wherein the access server is a Mobile Security Access Server (MSAS).

7. The method according to claim 3, wherein the identification information of the first containerized application comprises a signature and a package name of the first containerized application.

8. The method according to claim 5, wherein the identification information of the second containerized application comprises a signature and a package name of the second containerized application.

9. The method according to claim 5, wherein verifying that the first containerized application and the second containerized application are configured to exchange data comprises determining, by the first containerized application, that a signature and package name of the second containerized application is on the shared application list.

10. The method according to claim 1, wherein exchanging data between the first containerized application and the second containerized application comprises:
    sending, by the first containerized application, an encrypted intent to the second containerized application; and
    decrypting, by the second containerized application, the encrypted intent, using the IEK.

11. The method according to claim 10, wherein the encrypted intent is an intent encrypted with a root key and a session token.

12. The method according to claim 11, wherein the intent comprises a message package that indicates a description for an action or a topic.

13. The method according to claim 5, wherein the shared application list is decrypted using the root key.

14. The method according to claim 5, further comprising:
receiving, from the access server, an updated IEK;
authenticating the first containerized application with the access server; and
receiving, by the first containerized application, the updated IEK.

15. A non-transitory computer-readable storage medium storing a plurality of instructions executable by one or more processors to cause the one or more processors to perform operations comprising:
registering, by a device, a first containerized application on the device with an access server, wherein the registering the first containerized application with the access server comprises:
generating a first public/private key and storing the first public/private key in a first keystore of the first containerized application on the device;
storing an intent encryption key (IEK) from the access server in a second keystore of the first containerized application on the device, wherein the second keystore of the first containerized application is different from the first keystore of the first containerized application;
encrypting the second keystore of the first containerized application using a public key of the generated first public/private key,
wherein the first keystore and the second keystore are accessible only by the first containerized application;
registering, by the device, a second containerized application on the device with the access server;
verifying that the first containerized application and the second containerized application are configured to exchange data; and
exchanging data between the first containerized application and the second containerized application registered with the access server.

16. The non-transitory computer-readable storage medium according to claim 15, further comprising receiving an intent encryption key (IEK), a root key and a session token from the access server.

17. The non-transitory computer-readable storage medium according to claim 16, wherein the registering the first containerized application with the access server further comprises:
creating a shared application list and adding identification information of the first containerized application to the shared application list; and
encrypting the shared application list.

18. The non-transitory computer-readable storage medium according to claim 17, wherein the shared application list is encrypted using the root key from the access server.

19. The non-transitory computer-readable storage medium according to claim 17, wherein the registering the second containerized application with the access server comprises:
generating a second public/private key and storing the second public/private key in a first keystore of the second containerized application;
storing the IEK from the access server in a second keystore of the second containerized application;
encrypting the second keystore of the second containerized application using a second public key of the generated second public/private key; and
decrypting the shared application list and adding identification information of the second containerized application to the shared application list.

20. A system comprising:
a memory; and
one or more processors coupled to the memory and configured to:
register a first containerized application on a device with an access server, wherein the registering the first containerized application with the access server comprises:
generate a first public/private key and storing the first public/private key in a first keystore of the first containerized application on the device;
store an intent encryption key (IEK) from the access server in a second keystore of the first containerized application on the device, wherein the second keystore of the first containerized application is different from the first keystore of the first containerized application;
encrypt the second keystore of the first containerized application using a public key of the generated first public/private key,
wherein the first keystore and the second keystore are accessible only by the first containerized application;
register a second containerized application on the device with the access server;
verify that the first containerized application and the second containerized application are configured to exchange data; and
exchange data between the first containerized application and the second containerized application registered with the access server.

* * * * *